United States Patent
Kim et al.

(10) Patent No.: US 10,120,606 B2
(45) Date of Patent: Nov. 6, 2018

(54) DATA STORAGE DEVICES INCLUDING STORAGE CONTROLLER CIRCUITS TO SELECT DATA STREAMS BASED ON APPLICATION TAGS AND COMPUTING SYSTEMS INCLUDING THE SAME

(71) Applicant: Samsung Electronics Co., Ltd., Suwon-si, Gyeonggi-do (KR)

(72) Inventors: Min-Uk Kim, Incheon (KR); Moon-Sung Choi, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/369,952

(22) Filed: Dec. 6, 2016

(65) Prior Publication Data

US 2018/0024744 A1 Jan. 25, 2018

(30) Foreign Application Priority Data

Jul. 25, 2016 (KR) .................... 10-2016-0094351

(51) Int. Cl.
*G06F 3/06* (2006.01)

(52) U.S. Cl.
CPC .............. *G06F 3/064* (2013.01); *G06F 3/061* (2013.01); *G06F 3/0604* (2013.01); *G06F 3/0616* (2013.01); *G06F 3/0635* (2013.01); *G06F 3/0659* (2013.01); *G06F 3/0679* (2013.01); *G06F 3/0688* (2013.01)

(58) Field of Classification Search
CPC .......................................... G06F 3/06–3/0689
See application file for complete search history.

(56) References Cited

U.S. PATENT DOCUMENTS

| | | | |
|---|---|---|---|
| 7,321,720 B2 | 1/2008 | Winter et al. | |
| 7,679,133 B2 | 3/2010 | Son et al. | |
| 8,433,842 B2 | 4/2013 | Tanik | |
| 8,553,466 B2 | 10/2013 | Han et al. | |
| 8,559,235 B2 | 10/2013 | Yoon et al. | |
| 8,654,587 B2 | 2/2014 | Yoon et al. | |
| 8,880,826 B2 | 11/2014 | Cherian et al. | |
| 9,335,936 B2 * | 5/2016 | Busick | G06F 3/0611 |
| 9,696,935 B2 * | 7/2017 | Hashimoto | G06F 3/061 |
| 2008/0301256 A1 * | 12/2008 | McWilliams | G06F 12/0284 709/214 |
| 2011/0233648 A1 | 9/2011 | Seol et al. | |
| 2014/0208007 A1 | 7/2014 | Cohen et al. | |

(Continued)

OTHER PUBLICATIONS

Kang et al. "The Multi-streamed Solid-State Drive." Jun. 2014. USENIX. HotStorage '14.*

(Continued)

*Primary Examiner* — Nathan Sadler
(74) *Attorney, Agent, or Firm* — Ward and Smith, P.A.

(57) ABSTRACT

A data storage device includes a nonvolatile memory device including a plurality of memory blocks, and a storage controller that manages a plurality of streams in the plurality of memory blocks. The storage controller receives, from a host, a write command that requests a write operation and a data block including write data and an application tag appended to the write data, and selects one of the plurality of streams based on the application tag included in the data block. The storage controller writes the write data included in the data block into the selected one of the plurality of streams.

20 Claims, 10 Drawing Sheets

(56) References Cited

U.S. PATENT DOCUMENTS

| | | |
|---|---|---|
| 2014/0325143 A1 | 10/2014 | Kelton |
| 2015/0074337 A1 | 3/2015 | Jo et al. |
| 2015/0100865 A1 | 4/2015 | Noda |
| 2015/0135042 A1 | 5/2015 | Im et al. |
| 2016/0283125 A1* | 9/2016 | Hashimoto ....... G06F 17/30123 |
| 2016/0306552 A1* | 10/2016 | Liu .................... G06F 3/061 |
| 2017/0031631 A1* | 2/2017 | Lee ..................... G06F 3/0659 |
| 2017/0060479 A1* | 3/2017 | Hong ................... G06F 3/0659 |
| 2017/0371585 A1* | 12/2017 | Lazo .................... G06F 3/0656 |

OTHER PUBLICATIONS

Jonmichael Hands. "NVM Express 1.3 Delivering Continuous Innovation." Jun. 2017. http://www.nvmexpress.org/wp-content/uploads/NVMe_1.3_Webcast_June_28_2017.pdf.*

Dave Landsman. "NVM Express Workgroup Update." Aug. 2017. https://www.flashmemorysummit.com/English/Collaterals/Proceedings/2017/20170808_FA11_PartA.pdf.*

* cited by examiner

FIG. 8

| APP TAG | STREAM ID |
|---------|-----------|
| 1 | 1 |
| 7 | 2 |
| 3 | 3 |
| 2 | 4 |
| 8 | 1 |
| 10 | 2 |
| ... | ... |

| APP TAG | WORKLOAD(%) | STREAMID |
|---------|-------------|----------|
| 1 | 20 | 1 |
| 7 | 20 | 2 |
| 3 | 5 | 3 |
| 2 | 15 | 4 |
| 8 | 10 | 1 |
| 10 | 30 | 2 |

FIG. 10B

| STREAM ID | TOTAL WORKLOAD |
|-----------|----------------|
| 1 | 30 |
| 2 | 50 |
| 3 | 5 |
| 4 | 15 |

~151

DATA STORAGE DEVICES INCLUDING STORAGE CONTROLLER CIRCUITS TO SELECT DATA STREAMS BASED ON APPLICATION TAGS AND COMPUTING SYSTEMS INCLUDING THE SAME

CROSS-REFERENCE TO RELATED APPLICATIONS

This U.S. non-provisional application claims the benefit of priority under 35 U.S.C. § 119 to Korean Patent Application No. 10-2016-0094351 filed on Jul. 25, 2016 in the Korean Intellectual Property Office (KIPO), the entire disclosure of which is incorporated by reference herein in its entirety.

BACKGROUND

1. Technical Field

Some embodiments of the present inventive concepts relate to semiconductor memory devices, and more particularly to data storage devices including nonvolatile memory devices, and computing systems including the data storage devices.

2. Description of the Related Art

Hard disk drives (HDDs) have typically been used as data storage devices in computing systems, such as personal computers, server computers, etc. However, solid state drives (SSDs) including nonvolatile memory devices, such as flash memory devices (e.g., NAND type flash memory devices), have been developed. SSDs may exhibit higher performance and/or lower power consumption compared with HDDs. Accordingly, SSDs are beginning to replace HDDs in some applications.

In the flash memory of an SSD, an erase operation should be performed before a write operation. Further, in an SSD, write operations are performed on a page (or sector) basis, while erase operations are performed on a block basis, where a block includes a number of pages (or sectors). As data are continuously written to a flash memory, the data may become scattered over the entire flash memory. To obtain a free memory block, or a storage space to which data can be written, it is possible to perform a garbage collection operation from time to time that moves an effective page of one memory block to another memory block and erases the one memory block. However, read and write performance of the SSD may be reduced by this garbage collection operation. Further, performing the garbage collection operation may increase a write amplification that causes the number of write operations actually performed in the SSD to be greater than the number of write operations requested by a host, which can reduce the lifetime of the SSD.

SUMMARY

Some embodiments provide a data storage device having improved performance and improved endurance.

Some embodiments provide a computing system including a data storage device having improved performance and improved endurance.

According to some embodiments, a data storage device includes a nonvolatile memory device including a plurality of memory blocks; and a storage controller configured to manage a plurality of streams by dividing the plurality of memory blocks into the plurality of streams. The storage controller is further configured to receive, from a host, a write command that requests a write operation and a data block including write data and an application tag appended to the write data, to select one of the plurality of streams according to the application tag included in the data block, and to write the write data included in the data block into the selected one of the plurality of streams.

According to some embodiments, a computing system includes a host configured to generate a write command that requests a write operation and a data block including write data and an application tag appended to the write data, and a data storage device including a nonvolatile memory device including a plurality of memory blocks, the data storage device configured to receive the write command and the data block from the host, to select one of the plurality of streams according to the application tag included in the data block, and to write the write data included in the data block into the selected one of the plurality of streams.

The data storage device and the computing system according to some embodiments may write the write data to which the same application tag is appended into the same stream, and thus may write the data having similar lifetimes to the same memory block. Accordingly, the data storage device and the computing system may reduce the number of pages to be moved during a garbage collection operation and the number of garbage collection operations, thereby improving the performance and the endurance of the data storage device.

Further, the data storage device and the computing system according to some embodiments may determine the stream to which the write data are written according to the application tag included in the data block transferred from the host, and thus may efficiently use the plurality of streams of the data storage device even if the host does not support a multi-stream command.

BRIEF DESCRIPTION OF THE DRAWINGS

Illustrative, non-limiting example embodiments will be more clearly understood from the following detailed description taken in conjunction with the accompanying drawings.

FIG. 8 is a diagram illustrating an example of a stream mapping table included in a data storage device according to some embodiments.

FIG. 10A is a diagram illustrating an example of a stream mapping table included in a data storage device according to some embodiments.

FIG. 10B is a diagram illustrating an example of a stream workload table included in a data storage device according to some embodiments.

DETAILED DESCRIPTION OF THE EMBODIMENTS

Figure 1:
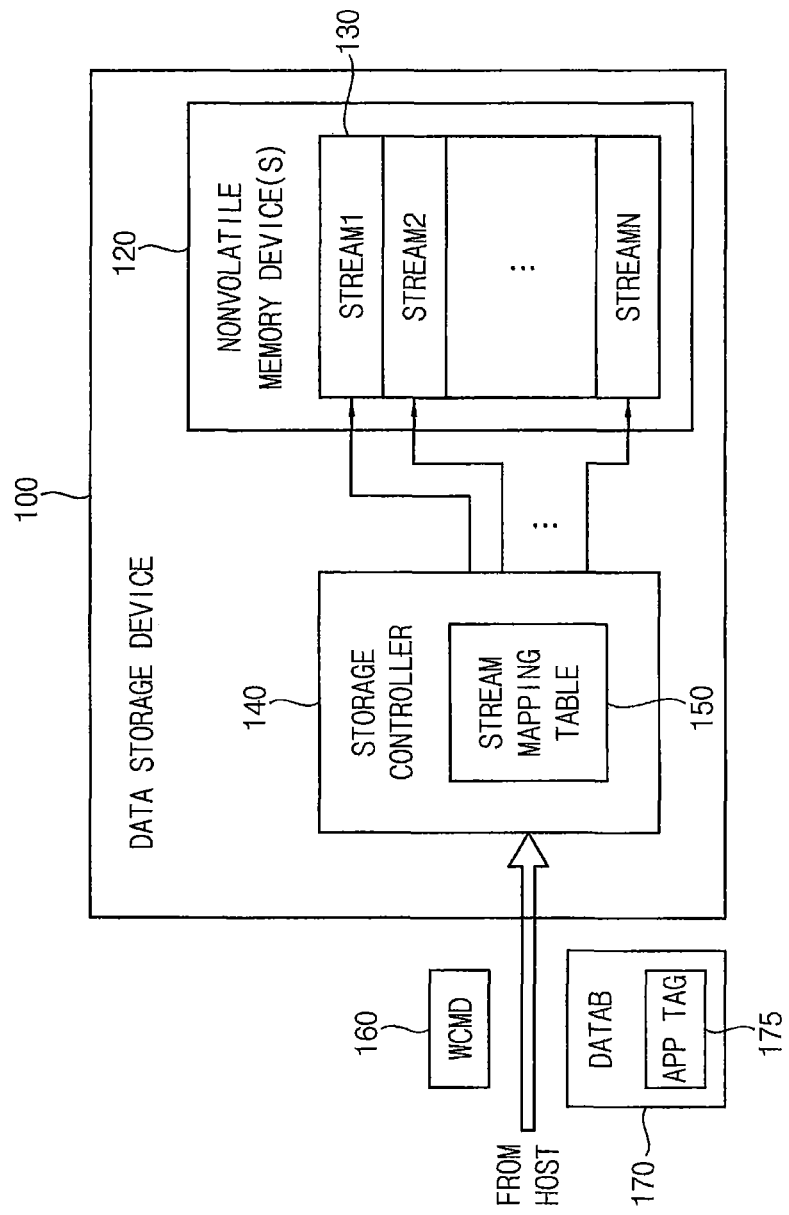
FIG. 1 is a block diagram illustrating a data storage device according to some embodiments.
Figure 2:
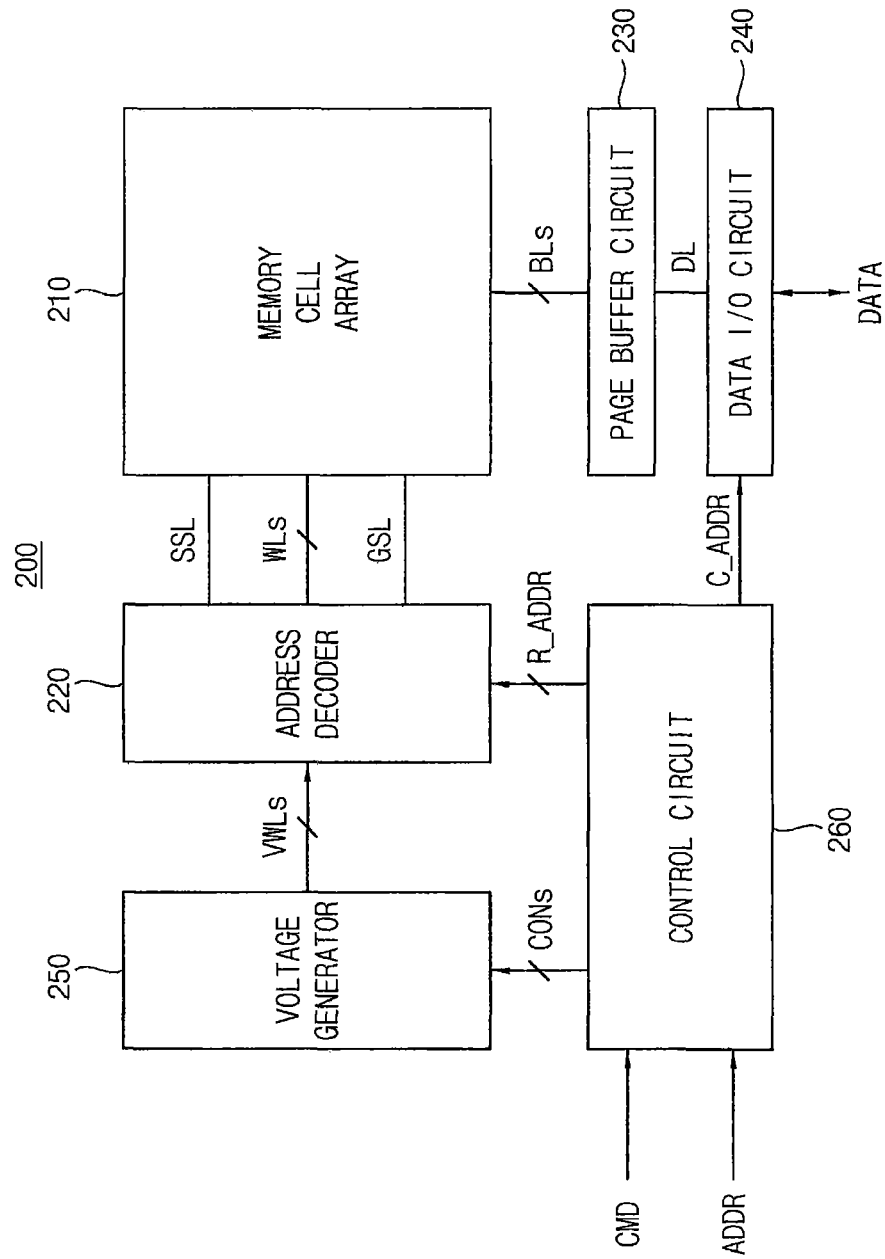
FIG. 2 is a block diagram illustrating an example of a nonvolatile memory device included in a data storage device of FIG. 1.
Figure 3:
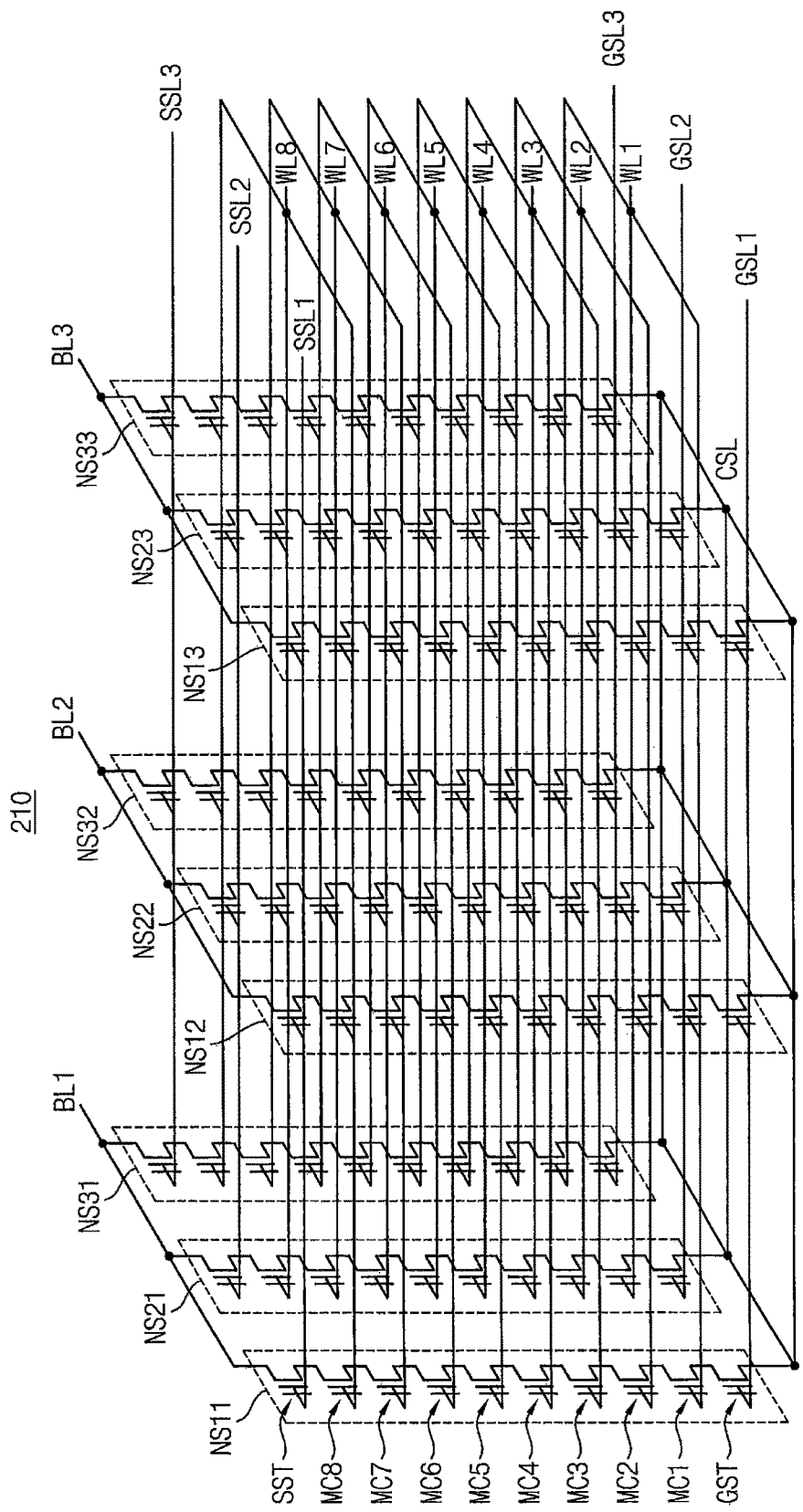
FIG. 3 is a block diagram illustrating an example of a memory cell array included in a nonvolatile memory device of FIG. 2.
Figure 4:
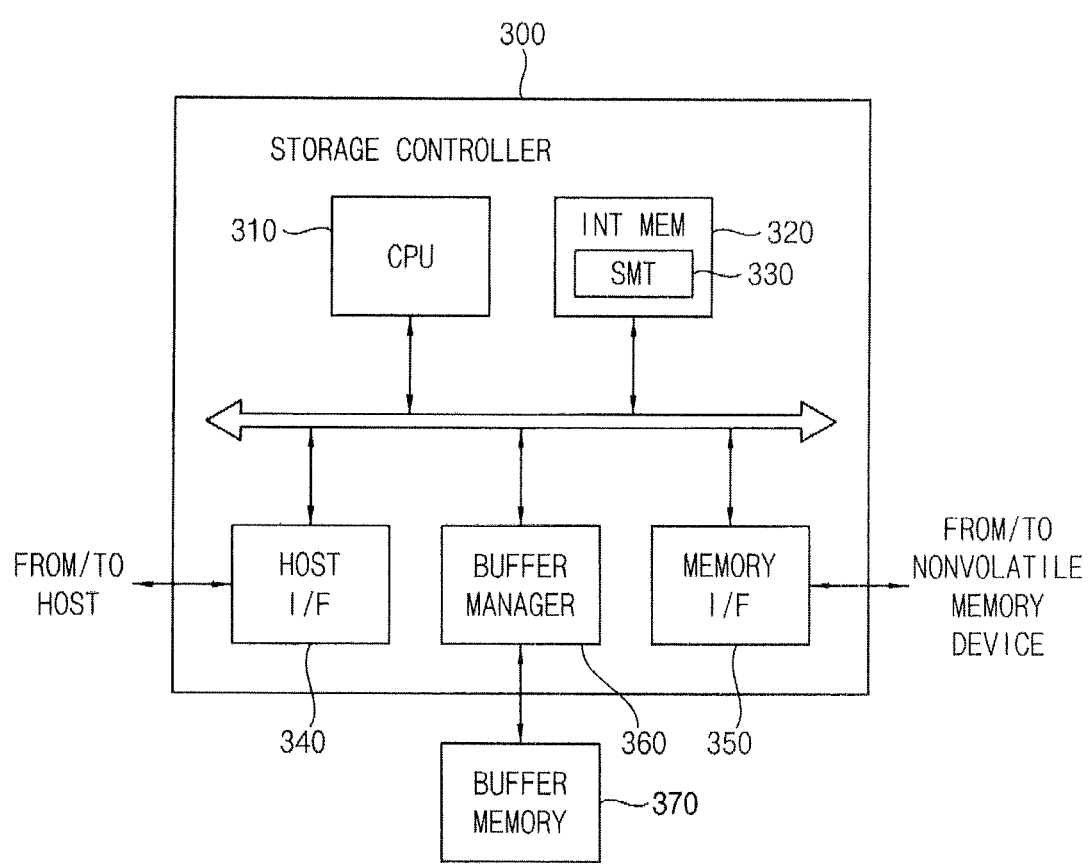
FIG. 4 is a block diagram illustrating an example of a storage controller included in a data storage device of FIG. 1.

FIG. 1 is a block diagram illustrating a data storage device according to some embodiments, FIG. 2 is a block diagram illustrating an example of a nonvolatile memory device included in a data storage device of FIG. 1, FIG. 3 is a block diagram illustrating an example of a memory cell array included in a nonvolatile memory device of FIG. 2, and FIG. 4 is a block diagram illustrating an example of a storage controller included in a data storage device of FIG. 1.

Referring to FIG. 1, a data storage device 100 according to some embodiments includes at least one nonvolatile memory device 120 including a plurality of memory blocks each having a plurality of nonvolatile memory cells, and a storage controller 140 that controls the nonvolatile memory device 120. Memory blocks in the nonvolatile memory device 120 may be organized into a plurality of streams 130. That is, a stream 130 is a logical unit that is mapped onto one or more physical memory blocks. A stream 130 may be mapped onto multiple memory blocks; however, each memory block may be mapped to only one stream. In some embodiments, the data storage device 100 may be a solid state drive (SSD) including a plurality of nonvolatile memory devices 120. In other some embodiments, the data storage device 100 may be an MMC card, an SD card, a multiuse card, a micro SD card, a memory stick, a compact SD card, an ID card, a PCMCIA card, a SSD card, a chip card, a smart card, a USB card, or the like.

Referring to FIG. 2, the nonvolatile memory device 120 may include a memory cell array 210, an address decoder 220, a page buffer circuit 230, a data input/output (I/O) circuit 240, a voltage generator 250 and a control circuit 260.

The memory cell array 210 may be coupled to the address decoder 220 through a string select line SSL, a plurality of word lines WLs and a ground select line GSL. The memory cell array 210 may be further coupled to the page buffer circuit 230 through a plurality of bit lines BLs.

The memory cell array 210 may include a plurality of nonvolatile memory cells coupled to the plurality of word lines WLs and the plurality of bit lines BLs.

In some embodiments, the memory cell array 210 may be a three dimensional memory cell array formed in a three dimensional structure (or a vertical structure) on a substrate. In this case, the memory cell array 210 may include vertical memory cell strings each having a plurality of stacked memory cells. The following patent documents, which are hereby incorporated by reference, describe suitable example configurations for the three dimensional memory cell arrays, in which the three dimensional memory cell array is configured as a plurality of levels, with word-lines and/or bit-lines shared between levels: U.S. Pat. Nos. 7,679,133; 8,553,466; 8,654,587; 8,559,235; and US Pat. Pub. No. 2011/0233648.

For example, the memory cell array 210 may be formed in the three dimensional structure as illustrated in FIG. 3. In an example of FIG. 3, a plurality of memory cell strings included in the memory cell array 210 may be formed in a vertical direction with respect to the substrate.

Referring to FIG. 3, the memory cell array 210 may includes a plurality of memory cell strings NS11 through NS33. Each memory cell string NS11 through NS33 may include a string select transistor SST, a plurality of memory cells MC1 through MC8 and a ground select transistor GST.

Although FIG. 3 illustrates an example where each memory cell string NS11 through NS33 includes eight memory cells MC1 through MC8, the present inventive concepts are not limited thereto.

The string select transistor SST may be coupled to a corresponding one of string select lines SSL1, SSL2 and SSL3. The memory cells MC1 through MC8 may be respectively coupled to corresponding word lines WL1 through WL8. The ground select transistor GST may be coupled to a corresponding one of ground select lines GSL1, GSL2 and GSL3. The string select transistor SST may be further coupled to a corresponding one of bit lines BL1, BL2 and BL3, and the ground select transistor GST may be further coupled to a common source line CSL.

Word lines (e.g., WL1) at the same level may be coupled to each other, and the string select lines SSL1, SSL2 and SSL3 and the ground select lines GSL1, GSL2 and GSL3 may be separated from each other.

Although FIG. 3 illustrates an example where the memory cell array 210 are coupled to eight word lines WL1 through WL8 and three bit lines BL1, BL2 and BL3, the present inventive concepts are not limited thereto.

In other some embodiments, the memory cell array 210 may be a two dimensional memory cell array formed in a two dimensional structure (or a horizontal structure) on a substrate.

Referring again to FIG. 2, the control circuit 260 may receive a command signal CMD and an address signal ADDR from the storage controller 140, and may control a program operation, a read operation and an erase operation of the nonvolatile memory device 120 and 200 based on the command signal CMD and the address signal ADDR.

For example, the control circuit 260 may generate control signals CONs for controlling the voltage generator 250 based on the command signal CMD, and may generate a row address R_ADDR and a column address C_ADDR based on the address signal ADDR. The control circuit 260 may provide the row address R_ADDR to the address decoder 220, and may provide the column address C_ADDR to the data I/O circuit 240.

The address decoder 220 may be coupled to the memory cell array 210 through the string select line SSL, the plurality of word lines WLs and the ground select line GSL.

For a write operation (or a program operation) or a read operation, the address decoder 220 may select one word line among the plurality of word lines WLs based on the row address R_ADDR provided from the control circuit 260.

The voltage generator 250 may generate word line voltages VWLs required for an operation of the nonvolatile memory device 200 based on the control signals CONS provided from the control circuit 260. The word line voltages VWLs generated by the voltage generator 250 may be applied to the plurality of word lines WLs via the address decoder 220.

For the write operation (or the program operation), the voltage generator 250 may generate a program voltage and a program pass voltage. The program voltage may be applied to the selected word line via the address decoder 220, and the program pass voltage may be applied to non-selected word lines via the address decoder 220.

For the read operation, the voltage generator 250 may generate a read voltage and a read pass voltage. The read voltage may be applied to the selected word line via the address decoder 220, and the read pass voltage may be applied to non-selected word lines via the address decoder 220.

The page buffer circuit 230 may be coupled to the memory cell array 210 through the plurality of bit lines BLs.

The page buffer circuit 230 may include a plurality of page buffers. In some embodiments, each page buffer may be coupled to one bit line. In other some embodiments, each page buffer may be coupled to two or more bit lines.

The page buffer circuit 230 may temporarily store data to be programmed to a selected page during the write operation (or the program operation), and may temporarily store data read from a selected page during the read operation.

The data I/O circuit 240 may be coupled to the page buffer circuit 230 through a data line DL.

During the write operation (or the program operation), the data I/O circuit 240 may receive program data DATA from the storage controller 140, and may provide the program data DATA to the page buffer circuit 230 based on the column address C_ADDR provided from the control circuit 260.

During the read operation, the data I/O circuit 240 may provide read data DATA stored in the page buffer circuit 230 to the storage controller 140 based on the column address C_ADDR provided from the control circuit 26Q.

Referring again to FIG. 1, the storage controller 140 may control operations (e.g., a write operation or a read operation) of the nonvolatile memory device 120 based on a command and data received from a host. For example, the storage controller 140 may receive, from the host, a write command 160 WCMD that requests a write operation and a data block 170 including write data DATAB and an application tag 175 appended to the write data, and may control the write operation of the nonvolatile memory device 120 based on the write command 160 and the data block 170.

Referring to FIG. 4, the storage controller 300 may include a central processing unit (CPU) 310, an internal memory 320, a host interface 340, a memory interface 350 and a buffer manager 360.

The CPU 310 may control an operation of the storage controller 300 in response to a command received through the host interface 340 from the host. In some embodiments, the CPU 310 may control respective components by employing firmware for operating the data storage device 100.

The internal memory 320 may store instructions and data executed and processed by the CPU 310. For example, the internal memory 320 may be implemented with a voltage memory, such as a static random access memory (SRAM), a dynamic random access memory (DRAM), or the like. The internal memory 320 may include a stream mapping table 330 that stores a plurality of application tags, and a plurality of stream IDs to which the plurality of application tags are mapped. The stream mapping table 330 will be described below with reference to FIGS. 8 and 10. In some embodiments, the internal memory 320 may be a cache memory for the CPU 310.

The host interface 31Q may provide physical connections between the host and the data storage device 100. The host interface 310 may provide an interface corresponding to a bus format of the host for communication between the host and the data storage device 100. In some embodiments, the bus format of the host may be a small computer system interface (SCSI) or a serial attached SCSI (SAS) interface.

In other some embodiments, the bus format of the host may be a universal serial bus (USB), PCI express, ATA, PATA, SATA, NVMe, etc., format.

The memory interface 350 may exchange data with the nonvolatile memory device 120. The memory interface 350 may transfer data stored in the buffer memory 370 to the nonvolatile memory device 120, or may receive data read from the nonvolatile memory device 120. In some embodiments, the memory interface 350 may be coupled to the at least one nonvolatile memory device 120 through one channel. In other some embodiments, the memory interface 350 may be coupled to the at least one nonvolatile memory device 120 through two or more channels.

The buffer manager 360 may control write and read operations of the buffer memory 370. For example, the buffer manager 360 may temporarily store write data provided from the host in the buffer memory 370, or may temporarily store read data read from the nonvolatile memory device 120 in the buffer memory 370. In some embodiments, the storage controller 300 may manage a plurality of streams 130 (FIG. 1) by dividing a plurality of memory blocks of the at least one nonvolatile memory device 120 into the plurality of streams 130. In this case, in some embodiments, the buffer manager 360 may, under control of the CPU 310, divide and manage a memory region of the buffer memory 370 into a plurality of memory regions respectively corresponding to the plurality of streams 130. For example, in a case where the data storage device 100 is set to support four streams 130, the buffer manager 360 also may divide and manage a write buffer region of the buffer memory 370 into four buffer regions respectively corresponding to the four streams 130. Although four streams 130 are illustrated in FIG. 1, it will be appreciated that more or less than four streams may be defined in the nonvolatile memory device 120. In some embodiments, the buffer memory 370 may be implemented with a DRAM. In other embodiments, the buffer memory 370 may be implemented with an SRAM, a phase random access memory (PRAM), a ferroelectric random access memory (FRAM), a resistive random access memory (RRAM), a magnetic random access memory (MRAM), etc. According to some embodiments, the buffer memory 370 may be located inside or outside of the storage controller 300.

In some embodiments, the storage controller 300 may further include an error correction code (ECC) block for error correction, a randomizing block for data randomization, etc. For example, the ECC block may perform coded modulation using a Bose-Chaudhuri-Hocquenghem (BCH) code, a low density parity check (LDPC) code, a turbo code, a Reed-Solomon code, a convolution code, a recursive systematic code (RSC), a trellis-coded modulation (TCM), a block coded modulation (BCM), etc., or may perform ECC encoding and ECC decoding using above-described codes or other error correction codes.

Referring again to FIG. 1, the storage controller 140 may manage a plurality of streams 130 by dividing a plurality of memory blocks included in the at least one nonvolatile memory device 120 into the plurality of streams 130. The storage controller 140 may divide the plurality of memory blocks into the plurality of streams 130 such that each stream 130 includes at least one of the memory blocks. In some embodiments, the storage controller 140 may allocate respective memory blocks of a plurality of nonvolatile memory devices having the same block number to the same stream. As noted above, a stream may be a logical unit that includes at least one memory block (or at least one active memory block). Accordingly, write data that is written to the same stream may be ensured to be written to a physically related storage space, i.e., at least one memory bock included in the same stream (or the same memory block), and write data that is to be written to different streams are ensured to be written to different memory blocks.

The storage controller 140 may receive, from the host, a write command 160 that requests a write operation along with a data block 170 including write data and an application tag 175 appended to the write data. The write command 160 may be a normal (i.e., conventional) write command that does not include a stream ID and is defined by a data storage device standard (e.g., a small computer system interface (SCSI) standard or a serial attached SCSI (SAS) standard). Examples of the write command 160 and the data block 170 will be described below with reference to FIGS. 5 and 6.

The storage controller 140 may select one stream from among the plurality of streams 130 included in the at least one nonvolatile memory device 120 based on the application tag 175 included in the data block 170. In some embodiments, the storage controller 140 may include a stream mapping table 150 that stores a plurality of application tags and a plurality of stream IDs. Each stream ID is associated with and uniquely identifies one of the streams 130. In the stream mapping table 150, each of the plurality of application tags may be mapped to one of the plurality of stream IDs. In some embodiments, a stream ID may be associated with more than one application tag. The storage controller 140 may search the stream mapping table 150 for the application tag 175 included in the data block 170. Once the application tag 175 has been located in the stream mapping table 150, the storage controller 140 may extract from the stream mapping table 150 a stream ID to which the searched application tag 175 is mapped from among the plurality of stream IDs. The storage controller 140 may then select the stream having the extracted stream ID from among the plurality of streams 130.

The storage controller 140 may write the write data included in the data block 170 into the selected stream. For example, the storage controller 140 may write the write data included in the data block 170 into the stream having the stream ID extracted from the stream mapping table 150 from among the plurality of streams 130. Thus, the storage controller 140 may write a plurality of write data to which the same application tag 175 is appended into the same stream, or the same memory block included in the same stream.

Generally, the plurality of write data to which the same application tag 175 is appended, or a plurality of write data that are request to be written by the same application of the host, may tend to have similar data lifetimes, and may tend to be invalidated at similar time points. Accordingly, if the plurality of write data to which the same application tag is appended, or the plurality of write data having similar data lifetimes are written into the same stream, or the same memory block in the same stream, the efficiency of a garbage collection of the data storage device 100 may be improved, and thus write and read performances of the data storage device 100 may be improved.

For example, in a case where the plurality of write data to which the same application tag 175 is appended are 'hot' data that are frequently accessed and updated, compared with a memory block of a conventional nonvolatile memory device where not only the hot data but also other data (e.g., 'normal' data or 'cold' data) are stored, a memory block into which these write data are written may have the relatively small number of valid pages when an erase operation is performed as part of a garbage collection operation. Accordingly, when the garbage collection operation is performed, the number of pages moved to another memory block may be reduced, and thus the number of write operations (or program operations) of the nonvolatile memory device 120 may be reduced. Further, a write amplification that causes the number of write operations actually performed in the data storage device 100 to become greater than the number of the write operations requested by the host may be decreased, and thus the endurance of the data storage device 100 may be improved.

Further, for example, in a case where the plurality of write data to which the same application tag 175 is appended are cold data that are rarely accessed and updated, compared with a memory block of a conventional nonvolatile memory device where not only the cold data but also other data (e.g., normal data or hot data) are stored, a memory block into which these write data are written may be valid for a relatively long time, and thus an erase operation for the memory block may not be required for a relatively long time. Accordingly, the number of garbage collection of the data storage device 100 or the number of erase operations of the garbage collection may be reduced.

In addition, a data storage device 100 according to some embodiments may perform a write operation for a plurality of streams 130 in response to a write command 160 and a data block 170 that are defined by a typical data storage device standard (e.g., a SCSI standard or a SAS standard). That is, even if the host does not support a multi-stream command that includes a stream ID for designating a stream into which write data are written, the data storage device 100 may write the write data to a stream selected from among the plurality of streams 130 based on the application tag 175, and thus may efficiently manage and use the plurality of streams 130. Thus, no software/hardware modification may be required at the host side for the data storage device 100 to be able to use the plurality of streams 130 to organize the storage of data.

As described above, a data storage device 100 according to some embodiments may determine the stream into which the write data is written based on the application tag 175 included in the data block 170 that is transferred from the host, and thus may more efficiently use the plurality of streams 130 even if the host does not support a multi-stream command. Further, the data storage device 100 according to some embodiments may write the plurality of write data to which the same application tag 175 is appended into the same stream, and thus may write the plurality of write data having similar lifetimes into the same memory block(s). Accordingly, the number of pages to be moved during garbage collection and the number of garbage collection operations may be reduced, and thus the performance and/or the endurance of the data storage device 100 may be improved.

Figure 5:
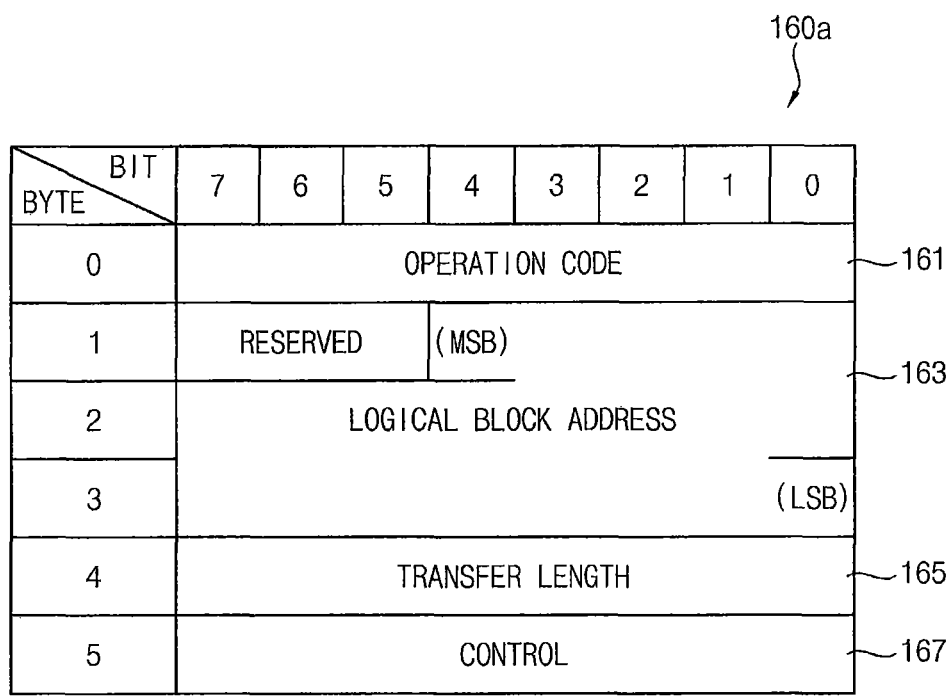
FIG. 5 is a diagram illustrating an example of a write command transferred from a host to a data storage device of FIG. 1.

FIG. 5 is a diagram illustrating an example of a write command transferred from a host to a data storage device of FIG. 1.

Referring to FIG. 5, a write command 160a may include an operation code 161 indicating a request of a write operation. The operation code 161 may represent that a transferred block (e.g., a command, descriptor block) is a write command block. For example, the operation code 161 of the write command 160a may have a size of one byte and a predetermined value, such as '0Ah', '2Ah', 'AAh', '8Ah', '7Fh', etc., but is not limited thereto. The write command 160a may further include a logical block address (LBA) 163 of a data block (or a logical block) that is to be subsequently transferred. For example, the logical block address 163 may have a size of 21 bits as illustrated in FIG. 5, a size of 32 bits or a size of 64 bits, but may not be limited thereto. The write command 160a may further include a transfer length 165 indicating the number of the data blocks that are to be subsequently transferred. For example, the transfer length 165 may have a size of one byte, but is not limited thereto. The write command 160a may further include a control byte 167. For example, the control byte 167 may have a size of one byte, but may not be limited thereto. The control byte 167 may include a normal auto contingent allegiance (NACS) bit and/or a LINK bit.

Although FIG. 5 illustrates an example of the write command 160a having a size of 6 bytes, the size of the write command 160a according to some embodiments is not limited thereto. For example, the write command 160a may have a size of 10 bytes, 12 bytes, 16 bytes, 32 bytes, etc. Further, the write command 160a of FIG. 4 is shown only for the purpose of illustration, and the write command 160a received by a data storage device according to same embodiments is not limited thereto.

Figure 6:
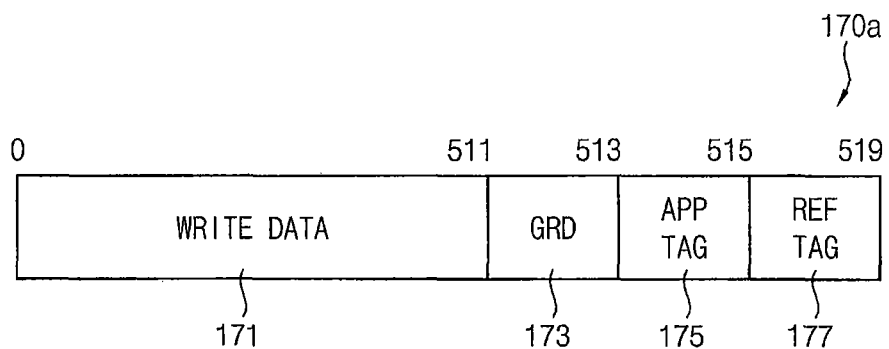
FIG. 6 is a diagram illustrating an example of a data block transferred from a host to a data storage device of FIG. 1.

FIG. 6 is a diagram illustrating an example of a data block transferred from a host to a data storage device of FIG. 1.

Referring to FIG. 6, a data block 170a may include write data (user data or sector data) 171, a guard (GRD) 173, an application tag (APP TAG) 175 and a reference tag REF TAG 177.

The write data 171 may be data requested to be written to a data storage device, and for example may have a size of 512 bytes. The guard 173 may be a cyclic redundancy check (CRC) code for the write data 171, and for example may have a size of 2 bytes. The application tag 175 may provide additional check information, and may include a process ID of an application that requests the write operation or other information. For example, the application tag 175 may have a size of 2 bytes. The reference tag 177 may include block address information that is used to check the data block 170a. For example, the reference tag 177 may include a lower four bytes of a logical block address of the data block 170a.

The data block 170a of FIG. 5 is shown only for the purpose of illustration, and the data block 170a received by a data storage device according to some embodiments may not be limited thereto.

Figure 7:
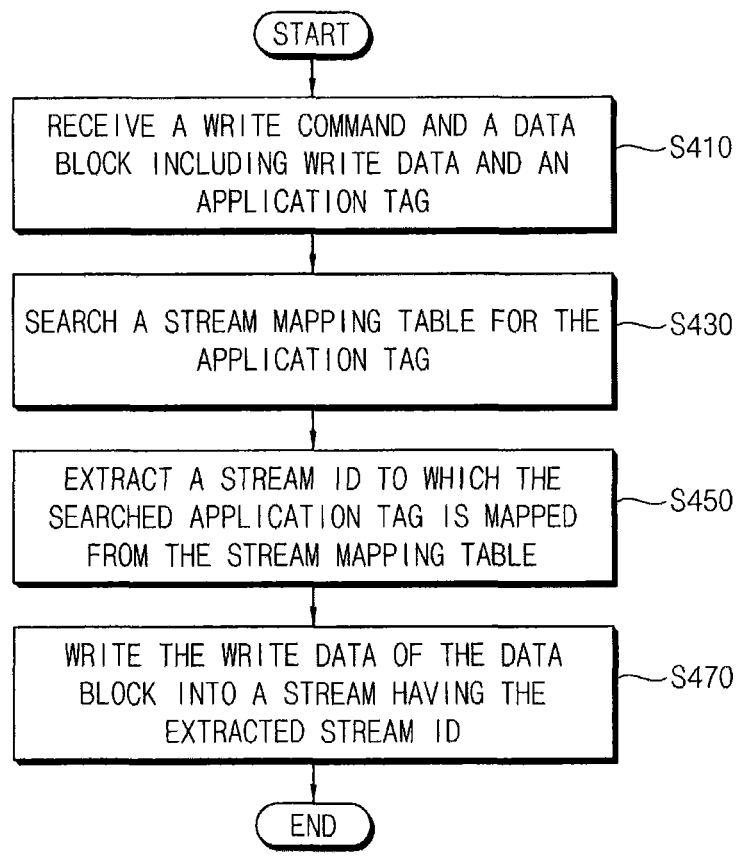
FIG. 7 is a flowchart illustrating a method of writing data in a data storage device according to some embodiments.
Figure 8:
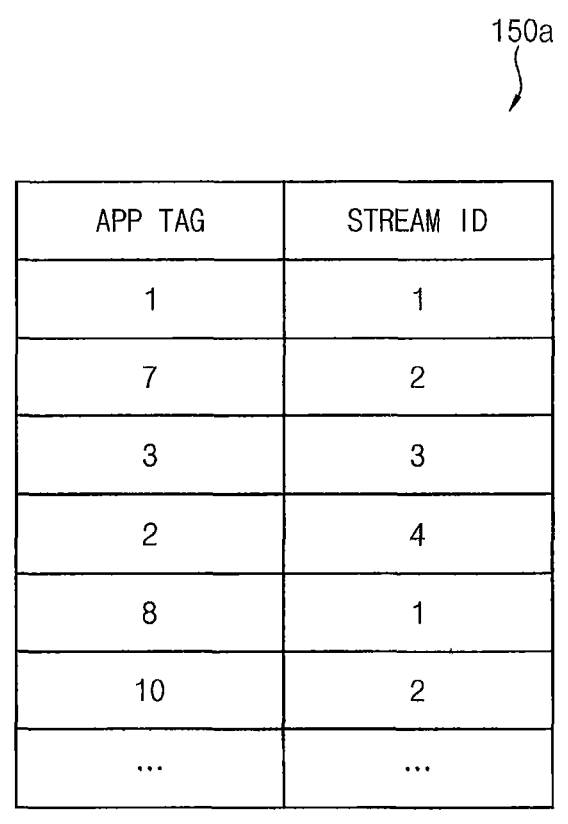

FIG. 7 is a flowchart illustrating a method of writing data in a data storage device according to some embodiments, and FIG. 8 is a diagram illustrating an example of a stream mapping table included in a data storage device according to some embodiments.

Referring to FIGS. 1, 7 and 8, a storage controller 140 may receive, from a host, a write command 160 that requests a write operation and a data block 170 including write data and an application tag 175 appended to the write data (S410). The write command 160 may be a normal write command that does not include a stream ID.

The storage controller 140 may search a stream mapping table 150 for the application tag 175 included in the data block 170 (S430). As illustrated in FIG. 8, the stream mapping table 150a may store a plurality of application tags and a plurality of stream IDs. Each of the plurality of application tags may be mapped to one of the plurality of stream IDs. In an example of FIG. 8, the application tag having a value of '1' may be mapped to a stream ID having a value of '1', and the application tag having a value of '7' may be mapped to a stream ID having a value of '2'.

The storage controller 140 may extract a stream ID to which the searched application tag is mapped among the plurality of stream IDs from the stream mapping table 150 (S450). In an example of FIG. 8, when the application tag 175 included in the data block 170 has a value of '7', the storage controller 140 may extract a stream ID having a value of '2' to which the application tag 175 having the value of '7' from the stream mapping table 150.

The storage controller 140 may write the write data of the data block 170 into a stream having the stream ID extracted from the stream mapping table 150 among the plurality of streams 130 (S470). In an example of FIG. 8, when the application tag 175 included in the data block 170 has a value of '7', the storage controller 140 may write the write data into a stream having the stream ID of '2'.

Accordingly, the data storage device 100 may determine the stream into which the write data is written according to the application tag 175 included in the data block 170 transferred from the host, and thus may more efficiently use the plurality of streams 130 even if the host does not support a multi-stream command.

Figure 9:
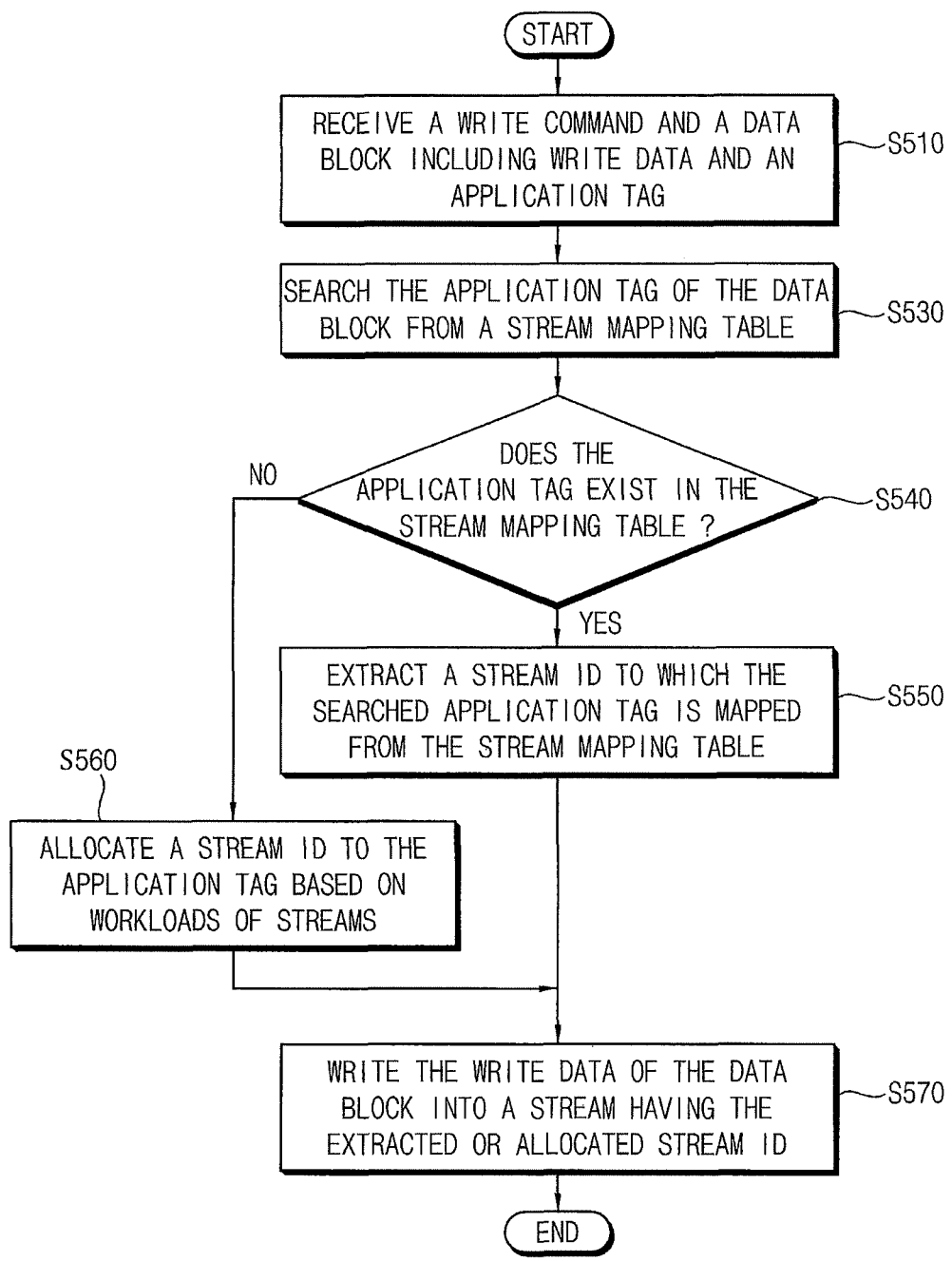
FIG. 9 is a flowchart illustrating a method of writing data in a data storage device according to some embodiments.

FIG. 9 is a flowchart illustrating a method of writing data in a data storage device according to some embodiments, FIG. 10A is a diagram illustrating an example of a stream mapping table included in a data storage device according to some embodiments, and FIG. 10B is a diagram illustrating an example of a stream workload table according to some embodiments.

Referring to FIGS. 1, 9, 10A and 10B, a storage controller 140 may receive a write command 160 and a data block 170 including write data and an application tag 175 (S510), and may search a stream mapping table 150 for the application tag 175 (S530). In some embodiments, as illustrated in FIG. 10A, the stream mapping table 150b may store not only a plurality of application tags and a plurality of stream IDs, but also workloads associated with the plurality of application tags. FIG. 10B illustrates a stream workload table 151 that tracks the aggregate workload associated with each stream. Thus, for example, the stream having a stream ID of '1' is associated with application tag 1 having a workload of 20% and application tag 8 having a workload of 10%. The stream associated with stream ID '1' thus has a total workload of 30%, as shown in the stream workload table 151 of FIG. 10B.

When the application tag 175 exists in the stream mapping table 150 (S540: YES), the storage controller 140 may extract a stream ID to which the searched application tag is mapped from the stream mapping table 150 (S550), and may write the write data of the data block 170 into a stream having the extracted stream ID (S570).

When the application tag 175 included in the data block 170 does not exist in the stream mapping table 150 (S540: NO), the storage controller 140 may allocate a stream ID of one stream of the plurality of streams 130 to the application tag 175, and store (or append) the application tag 175 and the allocated stream ID in the stream mapping table 150 (S560). In some embodiments, the storage controller 140 may determine the stream for which the stream ID is to be allocated to the application tag 175 based on aggregate workloads of the plurality of streams 130. For example, the storage controller 140 may determine a stream having a lowest aggregate workload among the plurality of streams 130 as the stream for which the stream ID is to be allocated to the application tag 175. For example, in an example of FIGS. 10A and 10B, the stream having a stream ID of '1' may have an aggregate workload of 30%, the stream having a stream ID of '2' may have an aggregate workload of 50%, the stream having a stream ID of '3' may have an aggregate workload of 5%, and the stream having a stream ID of '4' may have an aggregate workload of 15%. In this case, when the application tag 175 included in the data block 170 does not exist in the stream mapping table 150, the storage controller 140 may allocate a stream ID of '3' since the stream having the stream ID of '3' has the lowest aggregate workload at 5%. The storage controller 140 may write the write data into the one stream having the allocated stream ID and update the stream mapping table 150 and the stream workload table 151, respectively, to reflect the new allocation (S570).

In some embodiments, before the plurality of application tags are mapped to the plurality of stream IDs, the storage controller 140 may determine the workloads of the plurality of application tags by counting the number of write requests for the plurality of application tags. The storage controller 140 may map the plurality of application tags to the plurality of stream IDs based on the determined workloads of the plurality of application tags. For example, the storage controller 140 may fill only the application tag field and the workload field of the stream mapping table 150b for a predetermined time, and then may map the plurality of application tags to the plurality of stream IDs based on the workloads of the plurality of application tags. In some embodiments, the storage controller 140 may map the plurality of application tags to the plurality of stream IDs such that the workloads of the plurality of application tags are substantially uniformly distributed to the plurality of streams 130. For example, with respect to an application tag having a high workload, one entire stream may be allocated. Conversely, a single stream may be allocated multiple application tags having low workloads.

Figure 11:
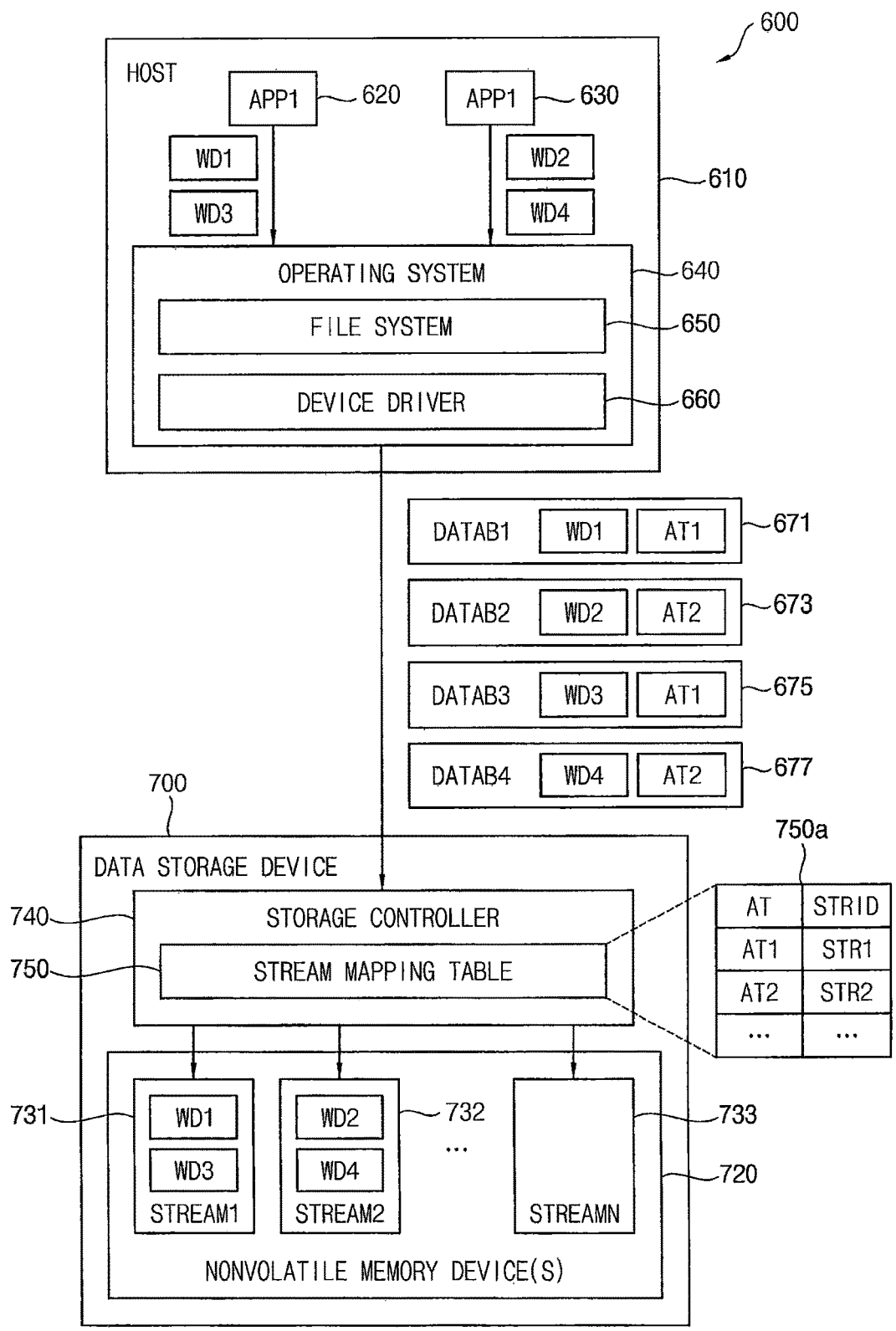
FIG. 11 is a block diagram illustrating a computing system including a data storage device according to some embodiments.

FIG. 11 is a block diagram illustrating a computing system including a data storage device according to some embodiments.

Referring to FIG. 11, a computing system 600 may include a host 610 and a data storage device 700. According to some embodiments, the host 610 may be any electronic device, such as a personal computer, a laptop computer, a server computer, a cellular phone, a smart phone, an MP3 player, a personal digital assistants (PDA), a portable multimedia player (PMP), a digital TV, a digital camera, portable game console, etc., and the data storage device 700 may be an SSD, an MMC card, an SD card, a micro-SD card, a memory stick, an ID card, a PCMCIA card, a chip card, a USB card, a smart card, a CF card, or the like attached to the host 610.

The host 610 may be operated by executing an operating system (OS) 640. The operating system 640 may include a file system 650 for file management and a device driver 660 for controlling peripheral devices including the data storage device 700 at the operating system level. The file system 650 may manage file names, extensions, file attributes, file sizes, cluster information, etc. of files accessed by requests from applications 620 and 630. The file system 650 may generate, delete and manage data on a file basis. The device driver 660 may a software module of a kernel for controlling the data storage device 700. The applications 620 and 630 may request a write operation and a read operation via the device driver 660. The host 610 may execute a plurality of applications 620 and 630 to provide various services. For example, the host 610 may execute a video application, a game application, a web browser application, etc.

The host 610 may generate a write command that requests a write operation to the data storage device 700 and a data block including write data and an application tag appended to the write data. The write command generated by the host 610 may not include a stream ID, and may be a normal write command defined by a data storage device standard. For example, the host 610 may execute a first application 620 and a second application 630, the first application 620 may request first write data WD1 and second write data WD3 to be written to the data storage device 700, and the second application 630 may request second write data WD2 and four write data WD4 to be written to the data storage device 700. The operating system 640 of the host 610 may generate a first data block 671 and a third data block 675 by appending a first application tag AT1 to the first write data WD1 and the third write data WD3 requested by the first application 620, and may generate a second data block 673 and a fourth data block 677 by appending a second application tag AT2 to the second write data WD2 and the fourth write data WD4 requested by the second application 630.

The data storage device 700 may include at least one nonvolatile memory device 720 including a plurality of streams 731, 732 and 733, and a storage controller 740 for controlling the nonvolatile memory device 720. The plurality of streams 731, 732 and 733 may be managed such that each stream 731, 732 and 733 includes at least one active memory block. In some embodiments, the plurality of streams 731, 732 and 733 may be generated (or opened) by a request of the host 610. In other some embodiments, the plurality of streams 731, 732 and 733 may be automatically generated by the data storage device 700 when the data storage device 700 is booted.

The data storage device 700 may receive the write command and the data block from the host 610. For example, as illustrated in FIG. 11, the data storage device 700 may receive the write command from the host, and then may further receive the first data block 671 including the first write data WD1 and the first application tag AT1, the second data block 673 including the second write data WD2 and the second application tag AT2, the third data block 675 including the third write data WD3 and the first application tag AT1, and the fourth data block 677 including the fourth write data WD4 and the second application tag AT2.

The data storage device 700 may select one of the plurality of streams 731, 732 and 733 according to the application tag included in the data block, and may write the write data included in the data block into the selected one of the plurality of streams. For example, in a case where the first application tag AT1 is mapped to a first string ID STR1 in a stream mapping table 750 and 750a of the storage controller 740, the storage controller 740 may write the first write data WD1 and the third write data WD3 to which the first application tag AT1 is appended into a first stream 731 having the first string ID STR1. Further, in a case where the second application tag AT2 is mapped to a second string ID STR2 in the stream mapping table 750 and 750a, the storage controller 740 may write the second write data WD2 and the fourth write data WD4 to which the second application tag AT2 is appended into a second stream 732 having the second string ID STR2. Accordingly, the write data (e.g., WD1 and WD3) to which the same application tag (e.g., AT1) is appended may be written into the same stream (e.g., 731) or the same memory block, thereby improving garbage collection efficiency and improving performance and endurance of the data storage device 700.

The inventive concepts may be applied to data storage devices including nonvolatile memory devices. For example, the inventive concepts may be applied to solid state drives or memory cards including flash memory devices.

The foregoing is illustrative of some embodiments and is not to be construed as limiting thereof. Although a few embodiments have been described, those skilled in the art will readily appreciate that many modifications are possible in the illustrated embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A data storage device comprising:
   a nonvolatile memory device including a plurality of memory blocks; and
   a storage controller configured to divide-the plurality of memory blocks into a plurality of streams, wherein each of the plurality of streams corresponds to at least one of the plurality of memory blocks,
   wherein the storage controller is further configured to receive, from a host, a write command that requests a write operation and a data block that includes write data and an application tag appended to the write data, to select one of the plurality of streams based on the application tag included in the data block, and to write the write data included in the data block into the selected one of the plurality of streams.

2. The data storage device of claim 1, wherein the storage controller is configured to write a plurality of write data to which the same application tag is appended into the selected one of the plurality of streams.

3. The data storage device of claim 1, further comprising:
   a stream mapping table configured to store a plurality of application tags and a plurality of stream IDs, each of the plurality of application tags being mapped to one of the plurality of stream IDs.

4. The data storage device of claim 3, wherein the storage controller is configured to search the stream mapping table for the application tag included in the data block, to extract from the stream mapping table a stream ID to which the application tag included in the data block is mapped, and to write the write data into a stream associated with the extracted stream ID.

5. The data storage device of claim 4, wherein, when the application tag included in the data block does not exist in the stream mapping table, the storage controller is configured to allocate a stream ID of one stream of the plurality of streams to the application tag, and to store the write data into the one stream.

6. The data storage device of claim 5, wherein the storage controller is configured to determine the one stream for which the stream ID is to be allocated to the application tag based on aggregate workloads of the plurality of streams.

7. The data storage device of claim 6, wherein the storage controller is configured to determine a stream having a lowest aggregate workload among the plurality of streams as the one stream for which the stream ID is to be allocated to the application tag.

8. The data storage device of claim 3, wherein the storage controller is configured to determine workloads of the plurality of application tags by counting a number of write requests for each of the plurality of application tags, and to map the plurality of application tags to the plurality of stream IDs based on the workloads of the plurality of application tags.

9. The data storage device of claim 8, wherein the stream mapping table is further configured to store the workloads of the plurality of application tags, and
   wherein the storage controller is configured to map the plurality of application tags to the plurality of stream IDs such that the workloads of the plurality of application tags are substantially uniformly distributed across the plurality of streams.

10. The data storage device of claim 1, wherein the write command does not include a stream ID.

11. The data storage device of claim 1, wherein the write command comprises:
    an operation code indicating that the write operation is requested;
    a logical block address of the data block; and
    a transfer length indicating a size of the data block to be transferred.

12. The data storage device of claim 1, wherein the data block further includes:
    a guard comprising, a cyclic redundancy check (CRC) code for the write data; and
    a reference tag including block address information used to check the data block.

13. A computing system comprising:
    a host configured to generate a write command that requests a write operation and a data block, the data block including write data and an application tag appended to the write data; and
    a data storage device including a nonvolatile memory device including a plurality of memory blocks, wherein the data storage device is configured to receive the write command and the data block from the host, to select one of a plurality of streams based on the application tag included in the data block, and to write the write data included in the data block into the selected one of the plurality of streams.

14. The computing system of claim 13, wherein the write command generated by the host does not include a stream ID.

15. The computing system of claim 13, wherein the host is configured to execute a first application that requests first write data to be written to the data storage device and a second application that requests second write data to be written to the data storage device, to generate a first data block by appending a first application tag to the first write data requested by the first application, and to generate a second data block by appending a second application tag to the second write data requested by the second application, and
    wherein the data storage device is configured to write the first write data into a first stream corresponding to the first application tag, and to write the second write data into a second stream corresponding to the second application tag.

16. A data storage device comprising:
    a nonvolatile memory device including a plurality of memory blocks that are divided into a plurality of streams, wherein each of the plurality of streams includes at least one of the plurality of memory blocks;
    a stream mapping table that maps the plurality of streams to a plurality of application tags, wherein each of the application tags is mapped to one of the plurality of streams; and
    a storage controller that receives a write command and a data block, wherein the data block includes write data and an application tag appended to the write data, determines if the application tag appended to the write data is in the stream mapping table, selects, in response to determining that the application tag appended to the write data is in the stream mapping table, the one of the plurality of streams that is mapped to the application tag included in the data block, and writes the write data included in the data block into the selected one of the plurality of streams.

17. The data storage device of claim 16, wherein, in response to determining that the application tag included in the data block is not in the stream mapping table, the storage controller is configured to map one of the plurality of streams to the application tag, and to store the write data into the selected one of the plurality of streams.

18. The data storage device of claim 17, wherein the storage controller is configured to determine the selected one of the plurality of streams that is to be mapped to the application tag based on aggregate workloads of the plurality of streams.

19. The data storage device of claim 18, wherein the storage controller is configured to identify a stream having a lowest aggregate workload among the plurality of streams as the selected one of the plurality of streams that is to be mapped to the application tag.

20. The data storage device of claim 16, wherein the storage controller is configured to determine workloads of the plurality of application tags by counting a number of write requests for each of the plurality of application tags, and to map the plurality of application tags to the plurality of streams based on the workloads of the plurality of application tags.

* * * * *